United States Patent
Skryabin et al.

(10) Patent No.: US 8,002,960 B2
(45) Date of Patent: Aug. 23, 2011

(54) METHOD FOR ELECTROLYTIC ENGINEERING OF NANO-PARTICULATE LAYERS

(75) Inventors: Igor Lvovich Skryabin, Yarralumia (AU); Graeme Leslie Evans, Kambah (AU)

(73) Assignee: Dyesol Ltd., Queanbeyan (AU)

( * ) Notice: Subject to any disclaimer, the term of this patent is extended or adjusted under 35 U.S.C. 154(b) by 858 days.

(21) Appl. No.: 10/583,121

(22) PCT Filed: Dec. 17, 2004

(86) PCT No.: PCT/AU2004/001768
§ 371 (c)(1), (2), (4) Date: Mar. 19, 2007

(87) PCT Pub. No.: WO2005/060008
PCT Pub. Date: Jun. 30, 2005

(65) Prior Publication Data
US 2008/0105362 A1    May 8, 2008

(30) Foreign Application Priority Data
Dec. 18, 2003 (AU) ................ 2003906985

(51) Int. Cl.
*C25D 15/00* (2006.01)
(52) U.S. Cl. .......... 205/220; 205/80; 205/106; 136/263
(58) Field of Classification Search ............ 205/220
See application file for complete search history.

(56) References Cited

U.S. PATENT DOCUMENTS

| | | | | |
|---|---|---|---|---|
| 4,142,947 | A * | 3/1979 | Cohen ............ | 205/50 |
| 4,666,567 | A * | 5/1987 | Loch ............. | 205/83 |
| 6,245,988 | B1 * | 6/2001 | Gratzel et al. ... | 136/263 |
| 6,340,633 | B1 * | 1/2002 | Lopatin et al. ... | 438/625 |
| 6,359,211 | B1 | 3/2002 | Spitler et al. | |
| 6,852,920 | B2 * | 2/2005 | Sager et al. .... | 136/263 |
| 2002/0145826 | A1 * | 10/2002 | Zangari et al. .. | 360/135 |
| 2003/0013008 | A1 * | 1/2003 | Ono ............. | 429/111 |
| 2004/0067613 | A1 | 4/2004 | Murofushi et al. | |

FOREIGN PATENT DOCUMENTS

| | | |
|---|---|---|
| CN | 1444290 | 9/2003 |
| EP | 0901175 | 10/1999 |
| EP | 1 213 775 | 6/2002 |
| EP | 1 289 028 | 3/2003 |

OTHER PUBLICATIONS

Lee et al., "Modification of Electrodes in Nanocrystalline Dye-Sensitized TiO2 Solar Cells" Solar Energy Materials & Solar Cells 65, pp. 193-200 (2001).*

Karuppuchamy et al., "Cathodic Electrodeposition of Oxide Semiconductor Thin Films and Their Application to Dye-Sensitized Solar Cells" Solid State Ionics 151, pp. 19-27 (2002).*

Regan et al., "Electrodeposited Nanocomposite n-p Heterojunctions for Solid-State Dye-Sensitized Photovoltaics" Adv. Mat. 12 (17), pp. 1263-1267 (2000).*

Kim et al., "Improved Performance of a Dye-Sensitized Solar Cell using a TiO2/ZnOEosin Y Electrode" Solar Energy Materials & Solar Cells 79, pp. 495-505 (2003).*

* cited by examiner

*Primary Examiner* — Harry D Wilkins, III
*Assistant Examiner* — Bryan D. Ripa
(74) *Attorney, Agent, or Firm* — Davis & Bujold, P.L.L.C.

(57) ABSTRACT

A method for manufacturing a nano-particulate electrode for Dye Solar Cells including the steps of providing an electrically conductive substrate, formation of a nanoparticulate layer on the substrate, application of dye to the nanoparticulate layer and an additional step of electrolytic treatment of the nanoparticulate layer in an electrolyte.

11 Claims, 2 Drawing Sheets

METHOD FOR ELECTROLYTIC ENGINEERING OF NANO-PARTICULATE LAYERS

This application is a national stage completion of PCTAU2004/001768 filed Dec. 17, 2004 which claims priority from Australian Application Serial No. 2003906985 filed Dec. 18, 2003.

TECHNICAL FIELD

This invention relates to nano-stuctured materials and their applications; to methods for the production of such materials. More particularly, this invention relates to nano-particulate oxide layers formed on a substrate.

BACKGROUND TO THE INVENTION

The nanomaterials, in particular- nano-particulate materials and nano-particulate oxides are used in wide range of applications: including but not limited to sensors, batteries, capacitors, photovoltaic cell (e.g. Dye Solar Cells), electrochromic devices, fuel cells and devices for photocatalytic cleavage and purification of water.

High commercial potential of Dye Solar Cell technology is achieved through the nano-particulate structure of oxide layer incorporating designed porosity, that warrants high surface area, and, thus,—enhanced ability to adsorb sufficient quantity of dye to effectively capture solar light on the interface between the dye layer and electrolyte.

It has been recognized that surface properties of nano-particles are critical for achieving high performance of devices based on nano-particulate materials.

Modifications of the said properties can be performed by covering each particle by a thin layer of another material. The purpose of such coating varies:

Creating a barrier layer (e.g. junction between two materials with different electronic properties). Benefits of the barrier layer include creation of internal electrical field, that allows for unidirectional transfer of electrons (diode effect).

Creating a blocking layer (electrical insulation of all or part of the surface of a particle from electrolyte or corrosive material).

Deposition of materials that absorb in the UV-Visual light—IR spectrum.

Electronic shielding of nano-structured oxides (NSO). Certain materials that reside adjacent to or in the surface of the NSO provide electronic shielding and, thus, prevent undesirable charge transfer through the interface between the surface and an electrolyte. This charge transfer causes leakage current: loss of voltage and undesirable side reactions, which lead to degradation of a device. Preferably the said Electronic Shielding Materials (ESM) are optically transparent and chemically stable.

Current methods include sol-gel chemistry and several different vacuum deposition techniques. Each technique is limited as each does not allow for fast and precise deposition and achievement of desirable properties of the layers.

OBJECT OF THE INVENTION

An objective of the present invention is to provide methods for surface modifications of nano-oxides and to improve performance of Dye Solar Cells.

SUMMARY OF THE INVENTION

From one aspect, the present invention provides for formation of complete or incomplete nano-particulate layers on or in the surface of an electrically conductive substrate directly from a colloidal solution by application of negative electrical potential to the substrate and positive electrical potential to a counter electrode. The nano-particles are further interconnected either to materials of the substrate or to each other by either sintering in furnace or by applying an AC electrical field of sufficient magnitude, such as high local current passing between particles resulting in heating of local contact points and fusing the particles together.

From another aspect of the invention, the nano particles are coated by dye. The coating is applied by immersing the electrode into the dye solution and applying an electrical field that promotes movement of charged dye in the solution towards the nano-oxide layer and subsequent bonding of dye molecules to the said nano-oxide particles.

In one embodiment in accordance with this aspect of the invention, the application of dye is followed by application of another dye or of another absorber that blocks areas of the nanoparticles that had not been covered by the first application of dye. The application of another dye or that of another absorber is conducted in the same manner as that of the first dye, e.g.—from solution and with aid of electrical field, which forces the dye molecules towards the nanomaterial that is normally, but not essentially, a nano-oxide.

According to a further aspect of the invention, a barrier layer is formed on surface of the said nanomaterial. For the purposes of this invention, the surface comprises that region from the interface to a depth of approximately 40 Angstroms or about 10 unit cells. The barrier layer typically comprises metal oxide, electronic properties of which differ from that of original nano-particulate layer. Application of such a barrier layer is conducted in solution by creation of an electrical field that promotes movement of material, in the form of ions, of the barrier layer towards nano-particles with subsequent deposition of this material on surface of the said nano-particles.

In one embodiment in accordance with this aspect of the invention two or more such materials with different electronic properties are deposited.

In a further embodiment in accordance with this aspect of the invention, the substrate is subsequently treated by heat and/or by oxygen to ensure stable bonding of the deposited material to the nano-particles and/or oxidation of the deposited material.

From another aspect of the invention an electrolytic treatment is used to modify surface properties of a nanomaterial. In one embodiment a clean and active surface of the nanoparticles is achieved by electrolytic dissolution of surface material. In another embodiment an electrolytic oxidation ensures carbon free layers of the nano-particulate material.

From yet another aspect of the invention the electrolytic deposition as disclosed above is conducted under constant current conditions with imposed voltage limits, such as when voltage reaches a predefined limit (measured with respect to the reference electrode) a control circuitry switches from the constant current to the constant voltage mode, keeping the constant voltage mode until either current drops below a predetermined value or a predetermined amount of electrical charge has passed through the electrolytic solution.

It has been found advantageous to perform the said deposition in a series of cycles with progressive increase of charge transferred through the electrolyte solution. Each cycle comprises an insertion and extraction half-cycle. During the insertion half-cycle a material to be deposited is promoted by an electrical field towards the nanomaterial. During the extraction half-cycle the material is removed from the nanomaterial.

Both insertion and extraction half-cycle are performed under current limiting conditions until the voltage reaches a voltage preset magnitude, continuing deposition under voltage limiting conditions until either the deposition current falls to a current preset magnitude or a preset charge has been delivered, and then terminating deposition.

It has been found advantageous to superimpose the constant current/constant voltage insertion/extraction mode with an applied AC electrical field. In one example the AC electrical field is applied parallel to the substrate, in another example—perpendicular to the substrate.

BRIEF DESCRIPTION OF DRAWINGS

Having broadly portrayed the nature of the present invention, embodiments thereof will now be described by way of example and illustration only. In the following description, reference will be made to the accompanying drawings in which.

DETAILED DESCRIPTION OF EXAMPLES

Figure 1:
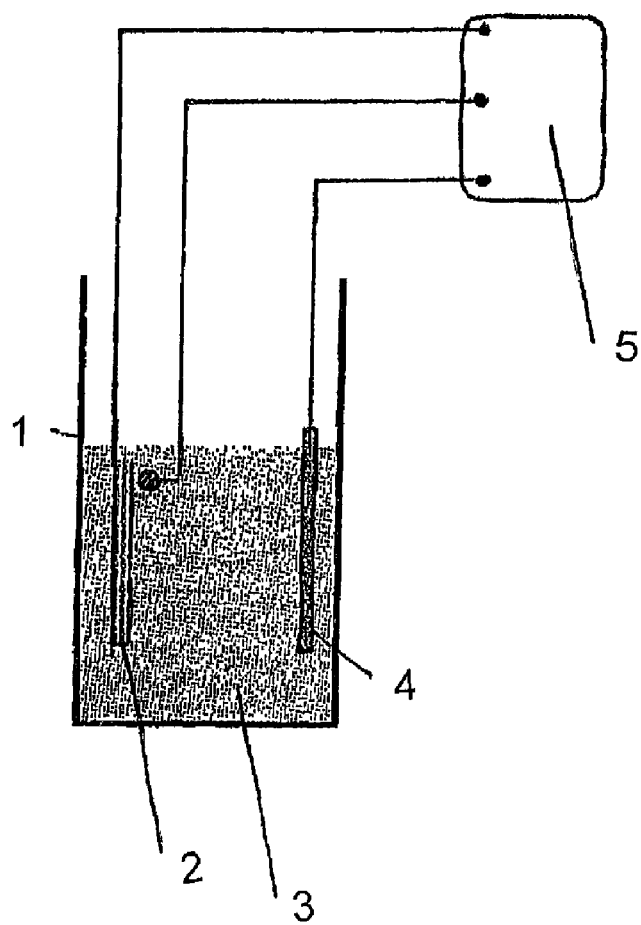
FIG. 1 is a diagrammatic representation of a setup for electrolytic treatment of nano-particulate electrode.

Referring to FIG. 1 a working nano-particulate electrode comprises a substrate 1 and a nano-particulate layer of a nanomaterial 2. The working electrode is inserted into an electrolyte 6 in such a way that regions of the nano-particulate layer that are selected for the electrolytic treatment are covered by the solution. A reference electrode 3 is located in close proximity to the nano-particulate layer 1. A counter electrode 4 is opposing the working electrode. Shape and position of the counter electrode are selected to ensure uniform electrical field between the counter and the working electrodes. All the 3 electrodes are connected to a programmable potentiostat 5.

The following materials are presented in this example:

Working electrode: 12-15 microns thick nano-particulate layer of titanium dioxide (titania) deposited on a conducting glass substrate (3 mm thick Pilkington TEC-15 glass).

The titania layer (approximately 11 mm×8 mm) was formed by screen printing of titania paste followed by firing at maximum of 550 C to achieve good sintering and interconnection of the titania particles (average particle size was 12-15 nm). The working electrode was prepared using the standard for Dye Solar Cell technology process, which is available in the prior art.

The electrolytic treatment of the working electrode was performed as follows:
   Reference electrode: Ag/AgCl standard micro-reference electrode.
   Counter electrode: Pt wire mesh
   Electrolyte: 1.4 g of $YCl_3 \cdot 6H_2O$ dissolved in 10 ml of iso-propanol; 1 ml of water was added to the solution.
Electrical Characteristics:
   Current density=0.1 mA/cm2,
   5 full cycles with small charging level (5 mC/cm2 in the insertion half-cycles),
   5 full cycles with intermediate charging level (10 mC/cm$^2$ in the insertion half-cycles),
   1 insertion half-cycle—charge of 10 mC/cm2.
Post-treatment:
   Following the electrolytic treatment a standard DSC dye was applied to the treated nano-particulate titania and standard cells were constructed. In some cases, the working electrodes were post-fired at various temperatures. Photovoltaic testing at 0.3 sun demonstrated significant improvement in open circuit voltage and fill factor for the treated samples. The maximum efficiency was achieved fox the sample, which was post-fired at 250 C (shown in FIG. 2).

Figure 2:
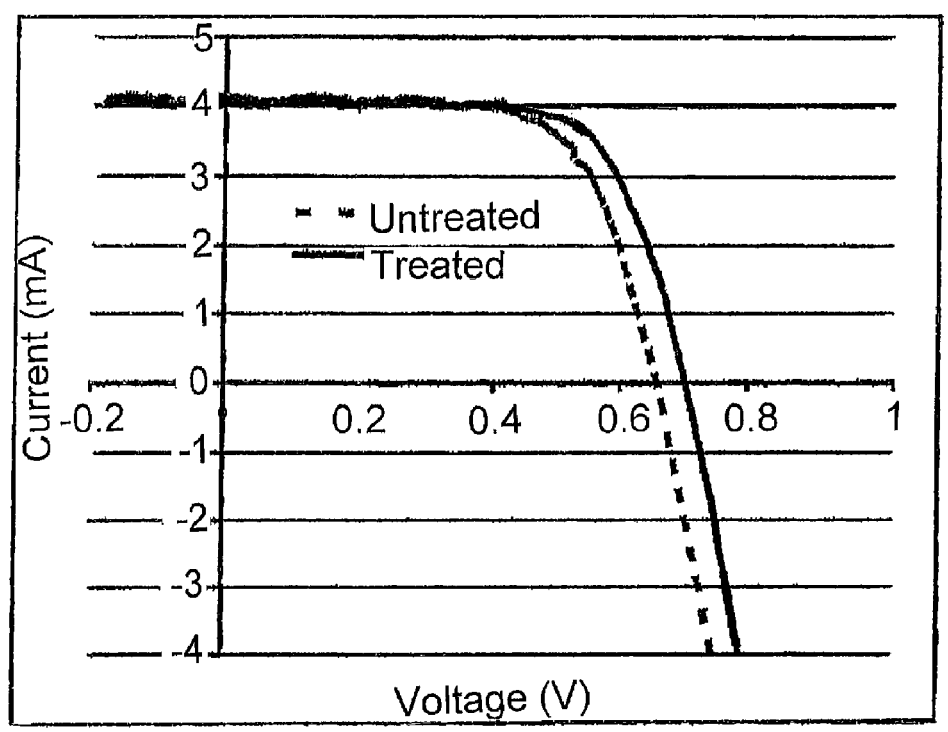
FIG. 2 demonstrates comparative photovoltaic performance of treated and untreated DSC electrode at 0.3 sun.

Referring to FIG. 2 a photovoltaic tests of treated and untreated electrode for DSC demonstrate that the electrolytic treatment results in significant improvement of photovoltaic voltage and power.

The invention claimed is:

1. A method for manufacturing a nano-particulate electrode for Dye Solar Cells including the steps of:
   providing an electrically conductive substrate,
   forming a nano-particulate layer on the substrate,
   electrolytically treating the nano-particulate layer in an electrolyte, wherein the electrolyte contains ions chemically different to the nano-particulate layer and the electrolytic treatment step comprises transferring the chemically different ions into the surface of the particles of the nano-particulate layer, and
   applying a dye to the nano-particulate layer.

2. The method according to claim 1, further comprising the step of heating, following the electrolytic treatment step.

3. The method according to claim 1, further comprising the step of partially removing material from the nano-particulate layer to the electrolyte during the electrolytic treatment step.

4. The method according to claim 1, further comprising the step of selecting the dye to comprise UV, visual light and/or Infra red absorbing material.

5. The method according to claim 1, further comprising the step of the electrolytically treating including at least one step of transferring a predetermined amount of electrical charge between the electrolyte and the nano-particulate layer.

6. The method according to claim 5, further comprising the steps of transferring the charge under constant current conditions with imposed voltage limits when voltage reaches imposed limit, a control circuitry switches from the constant current to the constant voltage mode, keeping the constant voltage mode until either the current drops below a predetermined current value or the predetermined amount of electrical charge has passed between the electrolyte solution and the nano-particulate electrode.

7. The method according to claim 5, further comprising the step of the electrolytically treating including at least first and second half-cycles, each transferring the predetermined amount of charge; in the first half-cycle the charge is transferred by movement of ions from the electrolyte to the nanoparticulate layer, in the second half-cycle the charge is transferred by movement of ions from the nano-particulate layer to the electrolyte.

8. The method according to claim 7, further comprising the step of the electrolytically treating including at least first and second cycles and a predetermined charge in the second cycle is larger than in the first cycle.

9. The method according to claim 1, further comprising the step of dissolving yttrium chloride in the electrolyte to yield the chemically different ions.

10. A method for manufacturing a nano-particulate electrode for Dye Solar Cells including the steps of:
   providing an electrically conductive substrate,
   forming a nano-particulate layer on the substrate,
   electrolytically treating the nano-particulate layer in an electrolyte, wherein the electrolyte contains ions chemically different to the nano-particulate layer and the electrolytic treatment step comprises transferring the chemically different ions into the surface of the particles of the nano-particulate layer to a depth of approximately 40 Angstroms, and
   applying a dye to the nano-particulate layer.

11. The method according to claim 10, further comprising the step of dissolving yttrium chloride in the electrolyte to yield the chemically different ions.

* * * * *